United States Patent
Sato et al.

(10) Patent No.: US 11,610,300 B2
(45) Date of Patent: Mar. 21, 2023

(54) DETERMINATION DEVICE AND DETERMINATION SYSTEM

(71) Applicant: SUBARU CORPORATION, Tokyo (JP)

(72) Inventors: Yoichi Sato, Tokyo (JP); Marosuke Kikuchi, Tokyo (JP); Shoichiro Sako, Tokyo (JP); Yuki Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 119 days.

(21) Appl. No.: 17/147,554

(22) Filed: Jan. 13, 2021

(65) Prior Publication Data

US 2021/0264580 A1    Aug. 26, 2021

(30) Foreign Application Priority Data

Feb. 20, 2020 (JP) .............................. JP2020-026794

(51) Int. Cl.
*G06K 9/00* (2022.01)
*G06T 7/00* (2017.01)
*G06F 3/14* (2006.01)
*G06K 9/62* (2022.01)
(Continued)

(52) U.S. Cl.
CPC ................ *G06T 7/001* (2013.01); *G06F 3/14* (2013.01); *G06K 9/6201* (2013.01); *B64F 5/50* (2017.01); *B64F 5/60* (2017.01); *G06T 2207/30164* (2013.01)

(58) Field of Classification Search
CPC .......... G06T 7/001; G06T 2207/30164; G06Q 10/20; G06F 3/14; G06K 9/6201; B64F 5/50; B64F 5/60
See application file for complete search history.

(56) References Cited

U.S. PATENT DOCUMENTS

2014/0312112 A1    10/2014  Floyd et al.
2014/0312114 A1*   10/2014  Floyd .................. G06F 16/9554
                                                        235/376
2016/0358324 A1    12/2016  Sugimoto et al.
(Continued)

FOREIGN PATENT DOCUMENTS

EP        2998909 A1    3/2016
EP        3208774 A1    8/2017
(Continued)

OTHER PUBLICATIONS

Extended European Search Report issued in corresponding European Patent Application No. 21 15 1142 dated May 25, 2021.
(Continued)

*Primary Examiner* — Samir A Ahmed
(74) *Attorney, Agent, or Firm* — Troutman Pepper Hamilton Sanders LLP (57) ABSTRACT

A determination device includes a computer. The computer is configured to compare an image of a component that is captured and a correct image that is associated with an operation procedure manual and in which the component is captured. The computer is configured to determine whether a component shape in the image of the component and a component shape in the correct image agree. If the two component shapes do not agree, the computer is configured to determine that the component and the operation procedure manual do not match.

12 Claims, 6 Drawing Sheets

(51) Int. Cl.
  *B64F 5/60* (2017.01)
  *B64F 5/50* (2017.01)

(56) References Cited

U.S. PATENT DOCUMENTS

2017/0011359 A1    1/2017  Endo
2017/0169400 A1    6/2017  Diwinsky et al.
2018/0033130 A1*   2/2018  Kimura ................. G06V 10/50
2020/0336703 A1*  10/2020  Sugimoto ........ G05B 19/41805

FOREIGN PATENT DOCUMENTS

| JP | 2011076561 | * | 4/2011 |
| JP | 2014-35635 A | | 2/2014 |
| JP | 2016-221671 A | | 12/2016 |
| JP | 6491194 B2 | | 3/2019 |

OTHER PUBLICATIONS

European Office Action issued in corresponding Application No. 21151142.3; dated Oct. 27, 2022; 9 pages.

* cited by examiner

DETERMINATION DEVICE AND DETERMINATION SYSTEM

CROSS-REFERENCE TO RELATED APPLICATIONS

The present application claims priority from Japanese Patent Application No. 2020-026794 filed on Feb. 20, 2020, the entire contents of which are hereby incorporated by reference.

BACKGROUND

The disclosure relates to a determination device and a determination system, and specifically relates to a determination device and a determination system configured to determine whether a component and an operation procedure manual match.

When the product quantities of components are large (that is, when the lots of components are large), for example, the components are often manufactured while being transferred on manufacturing lines. However, for example, when components are produced into multiple models in small lots and the lot of each component is small like the components of an aircraft, many of such components are produced by workers one by one.

Also for the production sites of such small-lot production of multiple models, various techniques for automatic production management and the like using a computer with a minimum of involvement by manual labor are proposed (see, for example, Japanese Unexamined Patent Application Publication or JP-A No. 2014-035635, JP-A No. 2016-221671, Japanese Patent No. 6491194, etc.).

SUMMARY

An aspect of the disclosure provides a determination device. The device includes a computer. The computer is configured to compare an image of a component that is captured and a correct image that is associated with an operation procedure manual and in which the component is captured. The computer is configured to determine whether a component shape in the image of the component and a component shape in the correct image agree. If the two component shapes do not agree, the computer is configured to determine that the component and the operation procedure manual do not match.

An aspect of the disclosure provides a determination system. The system includes an input device, an imaging device, a database, and the determination device. The input device is configured to input the number of an operation procedure manual. The imaging device is configured to capture an image of a component. The database is configured to store a correct image that is associated with the operation procedure manual and in which the component is captured. The determination device is configured to compare an image of the component captured by the imaging device and the correct image associated with the operation procedure manual of the number input with the input device.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

When, for example, numbering is performed on manufactured components if the product quantity of the components is large, the manufactured components undergo the numbering automatically while transferred on a manufacturing line or the like, whereas in a case of small-lot production of multiple models, such numbering is often performed through visual check by workers or the like regarding whether a component and an operation procedure manual, where the manufacturing procedures and the like of the component for identification of the component are described, match.

However, when a worker or the like transfers a manufactured component with man power to a subsequent process together with an operation procedure manual for example, a mismatch (that is, that the component and the component originally corresponding to the operation procedure manual are different) may occur between the component and the operation procedure manual. For example, aircraft components include many components that are very alike and difficult to be distinguished from one another and therefore, a problem of performing numbering without noticing a mismatch occurring between the component and the operation procedure manual (which is erroneous numbering) may be caused.

The disclosure has been made in view of the above-described respects and it is desirable to provide a determination device and a determination system that can precisely determine whether a mismatch is occurring between a component and an operation procedure manual.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Also in the description below, a case where a component of an aircraft is manufactured is taken as an example but the disclosure is not limited to the case.

Figure 1:
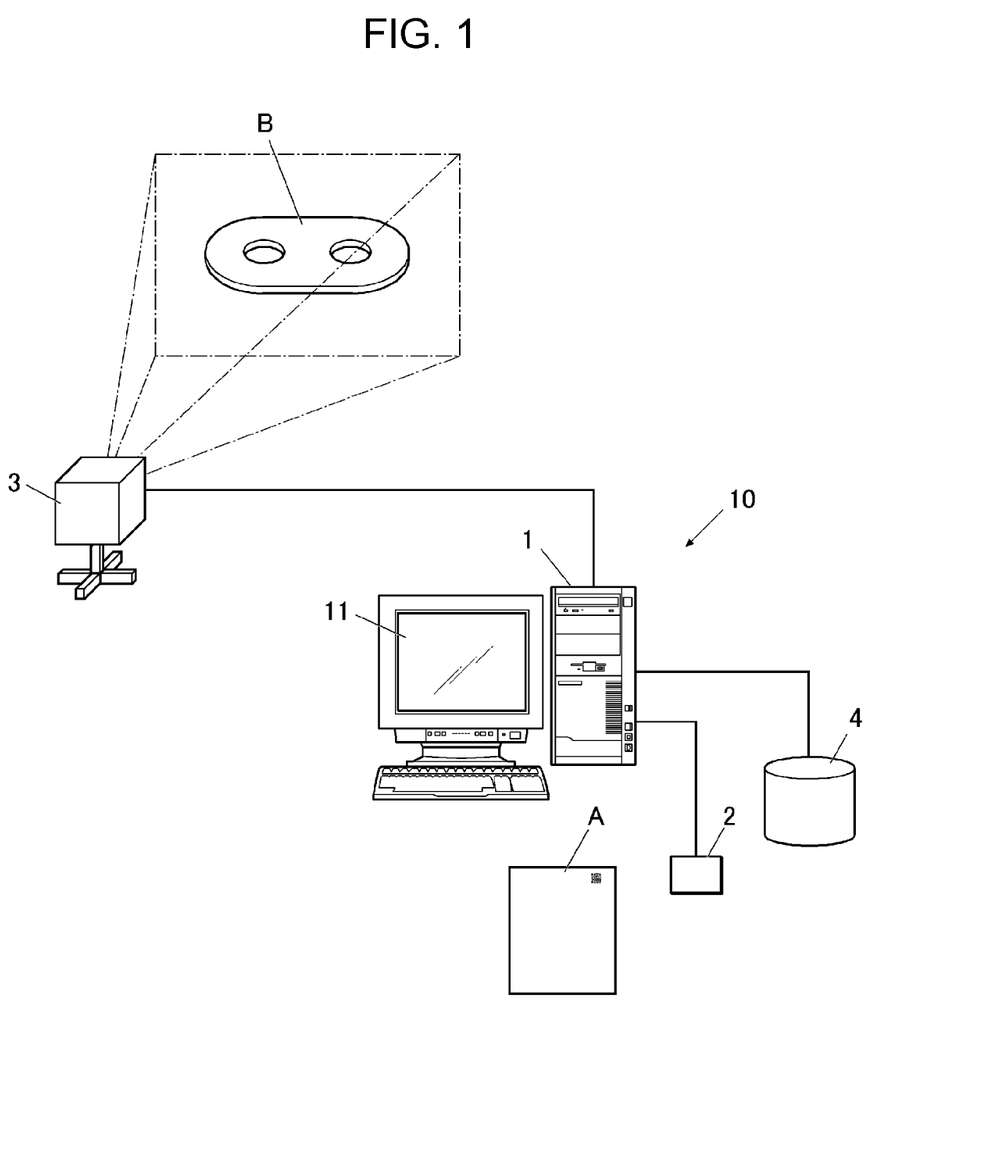
FIG. 1 is a diagram illustrating a configuration of a determination system according to an embodiment of the disclosure.

FIG. 1 is a diagram illustrating a configuration of a determination system 10 according to the present embodiment.

In the present embodiment, the determination system 10 includes a determination device 1, an input device 2, an imaging device 3, a database 4, and so on.

In addition, the determination system 10 includes other necessary devices, such as an illumination device and the like.

The input device 2 is used to input the number of an operation procedure manual A and, in the present embodiment, is a code reader to read and input a two-dimensional code that is specified in the operation procedure manual A and includes information on the number of the operation procedure manual A.

A keyboard or the like can also be used as the input device 2.

The imaging device 3 is used to take an image of a component B and configured to take a still image I in color, which is presented in RGB color space in the present embodiment. Further, the imaging device 3 is configured to transmit the taken image I to the determination device 1 after taking the image I of the component B.

In the present embodiment, an image of the component B is taken in a state of being secured with an unillustrated jig and the positional relation between the imaging device 3 and the component B is caused to be the same positional relation as that in a case where a later-described correct image I0 of the component B, which is an image regarded as being correct and obtained by taking the component B correctly manufactured.

The database 4 may be a storage means installed in the determination device 1. Further, the database 4 need not necessarily be directly coupled to the determination device 1 or the like but, for example, may be coupled via a communication network or be provided on a cloud.

In the database 4, the operation procedure manuals A and the correct images I0 of the component B corresponding to the operation procedure manuals A are stored in advance while the correct images I0 are associated with the respective operation procedure manuals A.

The correct image I0 is an image taken through careful inspection (initial article inspection) regarding whether the component B is manufactured in accordance with the operation procedure manual in, for example, initial manufacturing in assembly of an aircraft.

Further, in that time, the correct image I0 is taken with the component B being secured with the unillustrated jig.

Also when an image I is taken with the imaging device 3 of the determination system 10 according to the present embodiment after the second manufacturing, as described above, the image I is taken with the component B being secured with the jig in the same state of that while the correct image I0 is taken.

That is, the imaging device 3 is caused to take an image from the same distance and the same direction and under the same magnification relative to the component B and the jig as those in the initial article inspection. Thus, the positional relation between the imaging device 3 and the component B at the time of taking the image I with the imaging device 3 of the determination system 10 according to the present embodiment is the same positional relation as that at the time of taking the correct image I0 in the initial article inspection.

The determination device 1 according to the present embodiment is described below.

Although the determination device 1 in the present embodiment is constituted by a computer where a central processing unit (CPU), read only memory (ROM), random access memory (RAM), input and output interfaces, and the like, not illustrated, are coupled to a bus, the determination device 1 may be constituted by a dedicated device for example. Further, the determination device 1 includes a display screen 11 constituted by a liquid crystal display, an organic EL display, or the like.

The determination device 1 reads the correct image I0 associated with the operation procedure manual A with the number input through the input device 2 out from the database 4 and compares the image I of the component B captured by the imaging device 3 and the correct image I0 associated with the operation procedure manual A of the number input through the input device 2 to determine whether the component shape shown in the image I of the component B captured and the component shape shown in the correct image I0 match. If the two component shapes do not match, the determination device 1 determines that the component B and the operation procedure manual A do not match.

The foregoing configuration and further configuration of the determination device 1 are described below along the sequence of operation. In addition, functions and effects are also described.

A user, such as a worker, brings the component B manufactured and the operation procedure manual A corresponding to the manufactured component B to the determination system 10 and inputs the number or the like of the operation procedure manual A by causing the code reader, which is the input device 2, to read the two-dimensional code of the operation procedure manual A.

Further, the user secures the component B with the unillustrated jig disposed further forward than the imaging device 3 and takes an image of the component B with the imaging device 3.

Upon the input of the number or the like of the operation procedure manual A, the determination device 1 reads the correct image I0 associated with the operation procedure manual A of the input number out from the database 4.

After that, the component shape of the component B shown in the image I is identified from the image I of the component B captured by the imaging device 3. Further, the component shape shown in the correct image I0 is identified.

Figure 2A:
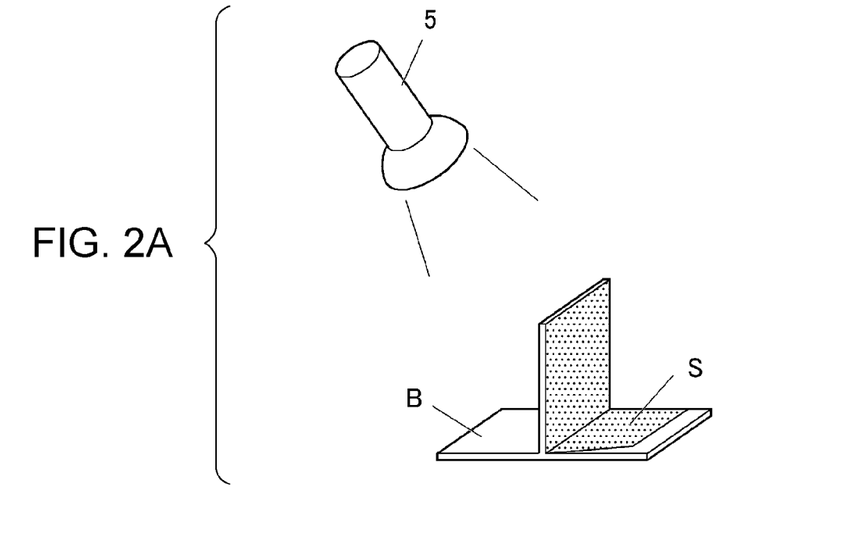
FIGS. 2A and 2B are diagrams for describing that how a shadow is made changes as the height of an illumination device and the illumination direction of the light vary.
Figure 2B:
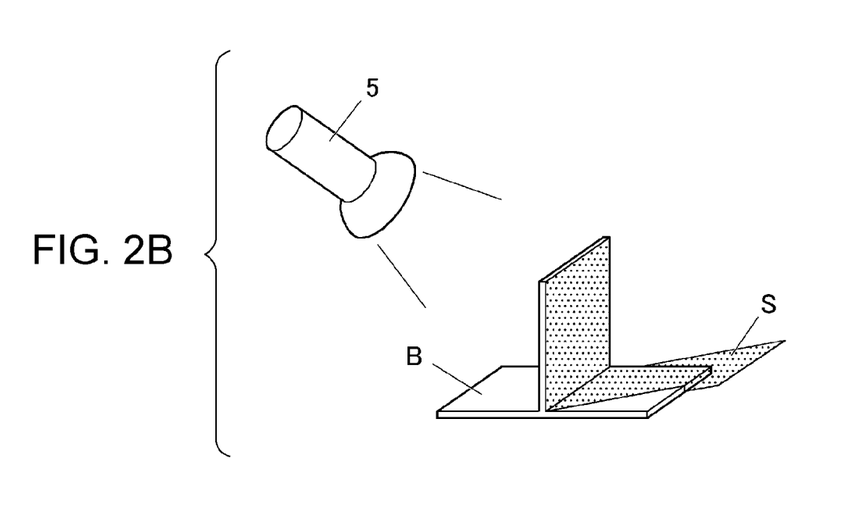

As illustrated in FIGS. 2A and 2B, for example, if the height of an illumination device 5 or the illumination direction of the light is changed in taking an image of the component B, a shadow S of the component B is made differently even when the distance or orientation of the component B relative to the imaging device 3 is unchanged. Accordingly, if the component shape is identified while the shadow S of the component B is shown in the image, a different component shape can be identified because of the difference in the shape of the shadow S even when the component B is shown in the image in the same state.

Thus, in identifying the component shape from an image, for example, the RGB color space of the image I taken with the imaging device 3 or the correct image I0 can be converted to an HSV color space and the image I or the correct image I0 can be modified on the basis of the hue (H component) and the chroma (S component) that are included in the resultant. Since the modified image I or the correct image I0 does not have lightness (V component), the shadow S that appears as a difference in lightness is deleted from the modified image I or the correct image I0.

Thus, it is also possible to generate the modified image I or the correct image I0 as described above so that the component shapes of the components B shown in the modified image I and correct image I0 can each be identified.

Further, the determination device 1 compares the component shape of the component B shown in the image I of the component B captured (or the modified image I, which is the same hereinafter) and the component shape of the component B shown in the correct image I0 (or the modified correct image I0, which is the same hereinafter) and determines whether the component shapes agree. Since the method of determining whether the component shapes shown in images agree is known, the description thereon is omitted.

In addition, when the determination device 1 determines that the respective component shapes shown in the two images I and I0 do not match, the determination device 1 determines that the component B and the operation procedure manual A do not match.

Figure 3A:
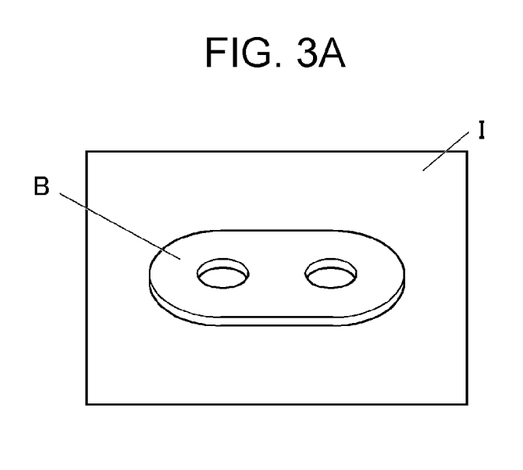
FIG. 3A is a diagram illustrating an example of an image in which a component brought by a user is captured and FIG. 3B is a diagram illustrating an example of a correct image associated with an operation procedure manual brought by the user.
Figure 3B:
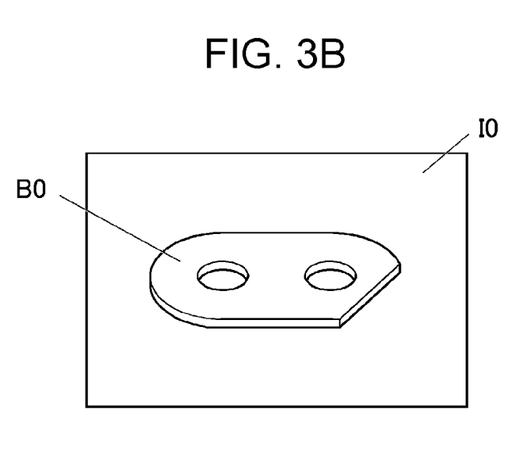

In one example, when the image I in which the component B brought by the user is captured is the image illustrated in FIG. 3A and the correct image I0 associated with the operation procedure manual A brought by the user is the image illustrated in FIG. 3B, the determination device 1 determines that the respective component shapes shown in the two images I and I0 do not match.

In this case, the component BO captured in the correct image I0 is different from the component B brought by the user and therefore, the operation procedure manual A with which the correct image I0 is associated relates to the component BO, not relating to the component B.

Thus, in such a case, the determination device 1 determines that the component B and the operation procedure manual A brought by the user do not match.

In the present embodiment, the determination device 1 compares the image I of the component B captured and the correct image I0 associated with the operation procedure manual A, and if the component shape of the component B shown in the image I of the component B and the component shape shown in the correct image I0 agree, the determination device 1 determines that the component B and the operation procedure manual A brought by the user match.

As described above, in the determination device 1 and the determination system 10 according to the present embodiment, the component shape shown in the image I in which the component B brought by the user is captured and the component shape shown in the correct image I0 associated with the operation procedure manual brought by the user are compared and if the two component shapes agree, it is determined that the component B and the operation procedure manual A brought by the user match, whereas if the two component shapes do not agree, it is determined that the component B and the operation procedure manual A brought by the user do not match.

Accordingly, by comparing the image I in which the component B is captured and the correct image I0 associated with the operation procedure manual A, it is enabled to precisely determine whether a mismatch is occurring between the component B and the operation procedure manual A brought by the user.

Thus, for example, by performing numbering on the component B brought by the user only if the component B and the operation procedure manual A match, occurrence of a problem, such as erroneous numbering, can be precisely prevented.

Figure 4:
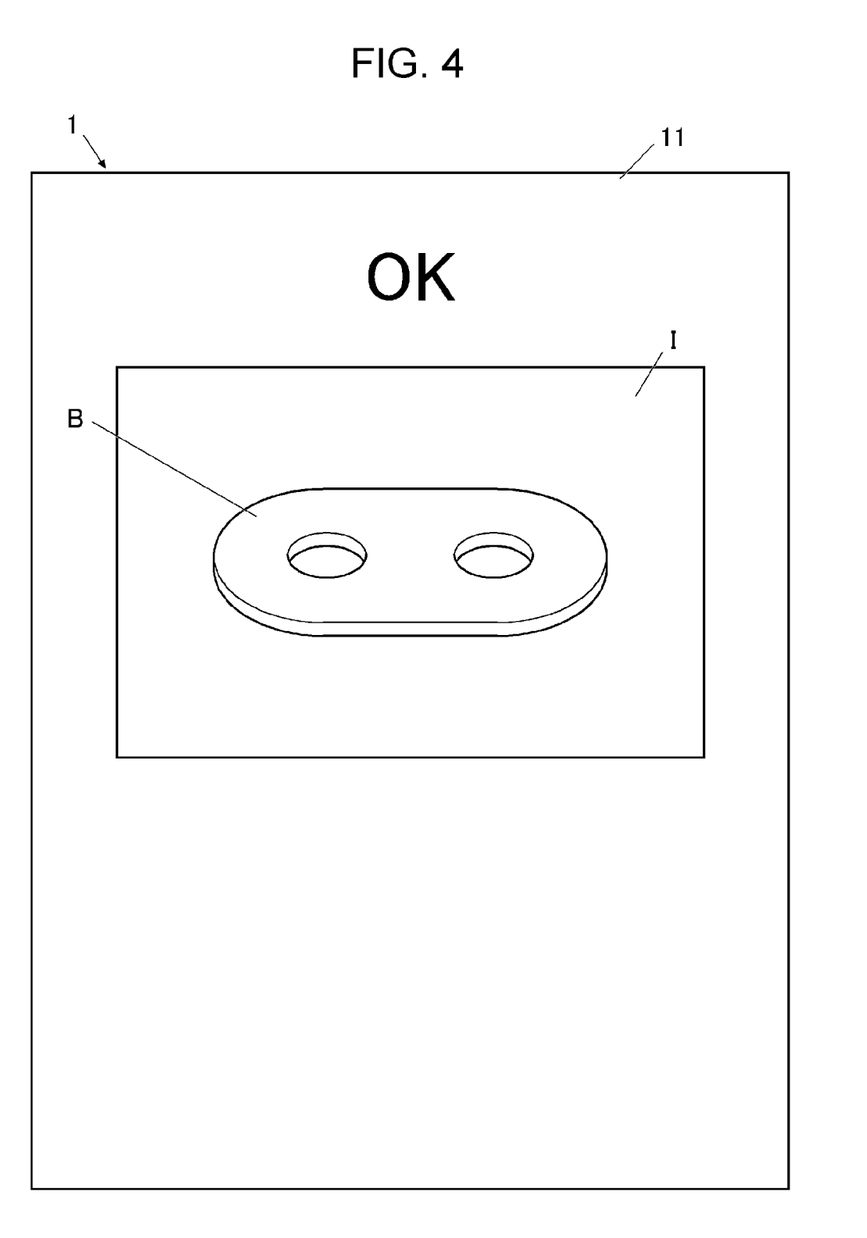
FIG. 4 is a diagram illustrating a display example on a display screen in a case where a determination device determines that the component and the operation procedure manual match.

As described above, to indicate that when the determination device 1 determines that the component B and the operation procedure manual A brought by the user match, the matching component B and operation procedure manual A can be transferred to a subsequent process, as illustrated in FIG. 4 for example, the determination device 1 can be configured to inform the user that the component B and the operation procedure manual A brought by the user match by causing "OK" or the like to be displayed on the display screen 11 together with the image I of the component B captured by the imaging device 3. The informing may use voice or the like.

Such configurations enable the user to make sure that the brought component B and operation procedure manual A match and transfer the component B and the operation procedure manual A to a subsequent process, such as numbering, without concern.

Although the similar applies hereinafter too, in addition to the above-described informing, the determination device 1 can also be configured to cause various kinds of information and the like to be displayed on the display screen 11 so as to inform the user, and such is performed when appropriate.

On the other hand, the determination device 1 can be configured to, when the determination device 1 determines that the component B and the operation procedure manual A brought by the user do not match as described above, cause the correct image I0 associated with the operation procedure manual A brought by the user to be displayed on the display screen 11 so as to inform the user of the mismatch.

Figure 5:
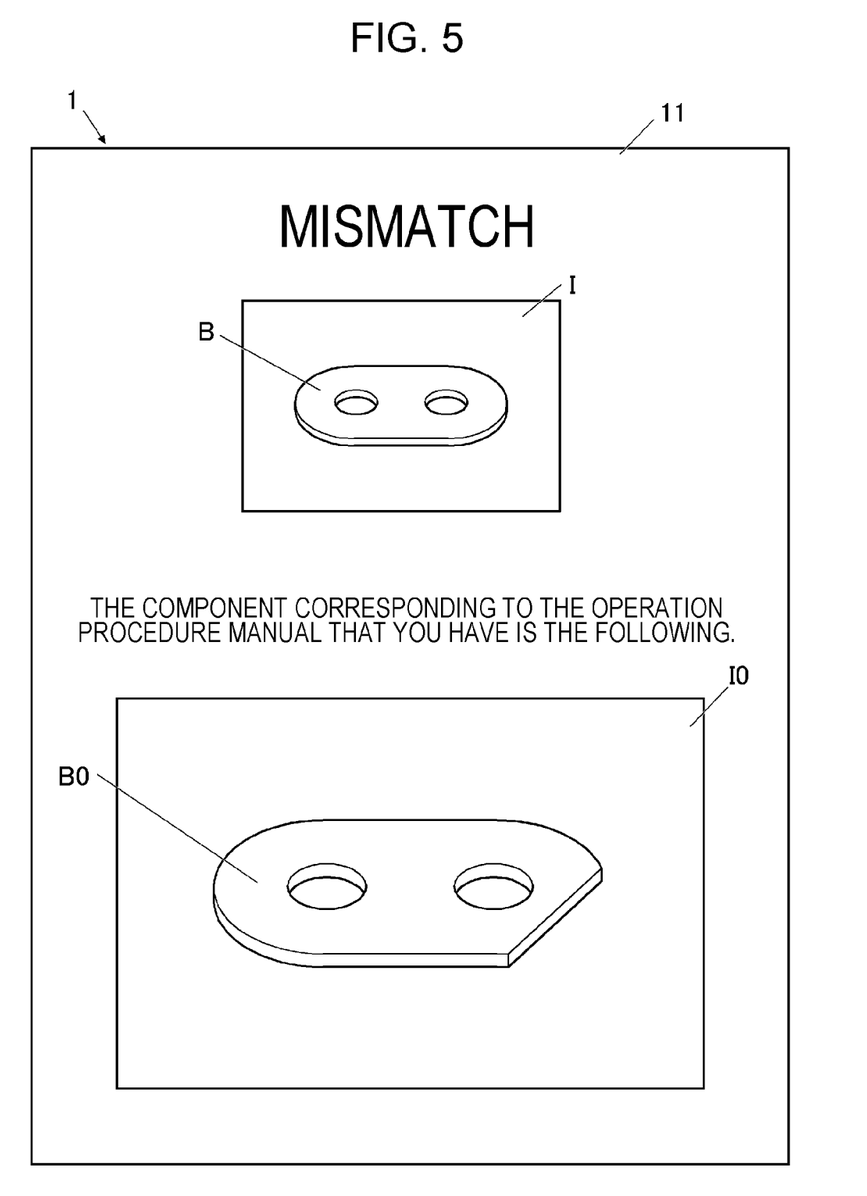
FIG. 5 is a diagram illustrating a display example on the display screen in a case where the determination device determines that the component and the operation procedure manual do not match and a correct image is displayed on the display screen.

In this case, to inform the user that the component B and the operation procedure manual A brought by the user do not match, for example, the determination device 1 causes "MISMATCH" or the like to be displayed on the display screen 11 as illustrated in FIG. 5. Further, the determination device 1 can be configured to inform the user of a component BO corresponding to the operation procedure manual A brought by the user by causing "THE COMPONENT CORRESPONDING TO THE OPERATION PROCEDURE MANUAL THAT YOU HAVE IS THE FOLLOWING." or the like to be displayed and causing the correct image I0 to be displayed largely, for example.

In this case, the user finds the component BO displayed and places the component BO in front of the imaging device 3 to take an image thereof, and then causes the determination device 1 to perform determination in a manner similar to that described above and causes the determination device 1 to determine whether the component BO newly brought and the operation procedure manual A match.

Further, when the determination device 1 determines that the component brought by the user matches the operation procedure manual A brought by the user, the determination device 1 informs the user that the component BO brought by the user matches the operation procedure manual A by causing "OK" or the like to be displayed as illustrated in FIG. 4.

Moreover, when the determination device 1 determines that the component brought by the user does not match the operation procedure manual A brought by the user, the determination device 1 informs the user again that the component B brought by the user and the operation procedure manual A do not match by causing "MISMATCH" to be displayed as illustrated in FIG. 5 again or causing the component B0 (the correct image I0) corresponding to the operation procedure manual A brought by the user to be displayed largely again for example.

After that, the user repeats the above-described operation until the brought component B matches the operation procedure manual A.

On the other hand, the component B that does not match the operation procedure manual A is in the state of not having any corresponding operation procedure manual A.

It is thus possible to configure the determination device 1 so that the user is encouraged to find the operation procedure manual A corresponding to the component B.

That is, the determination device 1 can be configured to, when the determination device 1 determines that the component B and the operation procedure manual A brought by the user do not match as described above, extract the correct image I0 where the component B concerned is shown from among the correct images I0 stored in the database 4 and cause an operation procedure manual A0 associated with the extracted correct image I0 or information on the operation procedure manual A0 to be displayed on the display screen 11.

In this case, in a manner similar to that described above, the determination device 1 can be configured to compare the component shape of the component B shown in the image I of the component B captured by the imaging device 3 and the component shape shown in the correct image I0 and extract the correct image I0 with the matching component shape.

Figure 6:
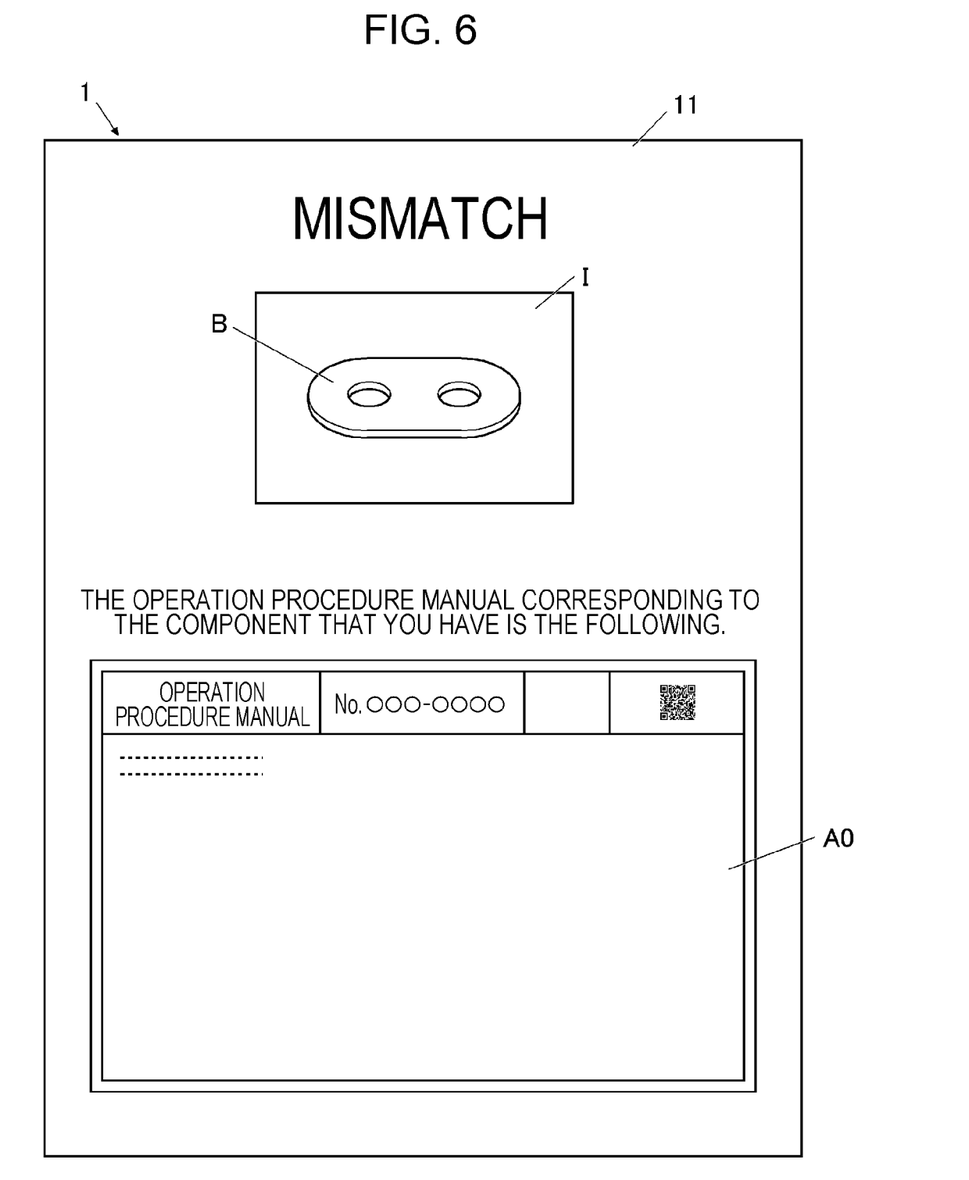
FIG. 6 is a diagram illustrating a display example on the display screen in a case where the determination device determines that the component and the operation procedure manual do not match and the operation procedure manual is displayed on the display screen.

Also in this case, to inform the user that the component B and the operation procedure manual A brought by the user do not match, the determination device 1 causes "MISMATCH" or the like to be displayed on the display screen 11 as illustrated in FIG. 6 for example.

Further, the determination device 1 can be configured to inform the user of the operation procedure manual A corresponding to the component B brought by the user by causing "THE OPERATION PROCEDURE MANUAL CORRESPONDING TO THE COMPONENT THAT YOU HAVE IS THE FOLLOWING." or the like to be displayed and causing the operation procedure manual A0 associated with the extracted correct image I0 to be displayed largely, for example.

The determination device 1 may also be configured to cause information on the operation procedure manual A, such as the number, to be displayed instead of or in addition to causing the operation procedure manual A itself to be displayed.

In this case, the user finds the displayed operation procedure manual A and inputs the number or the like of the operation procedure manual A by causing the code reader as the input device 2 to read the two-dimensional code of the operation procedure manual A, and then causes the determination device 1 to perform determination in a manner similar to that described above and causes the determination device 1 to determine whether the component B and the operation procedure manual A newly brought match.

Further, when the determination device 1 determines that the operation procedure manual A brought by the user matches the component B brought by the user, the determination device 1 informs the user that the operation procedure manual A brought by the user matches the component B by causing "OK" or the like to be displayed as illustrated in FIG. 4.

Moreover, when the determination device 1 determines that the operation procedure manual A brought by the user does not match the component B brought by the user, the determination device 1 informs the user again that the component B and the operation procedure manual A brought by the user do not match by causing "MISMATCH" to be displayed as illustrated in FIG. 5 again or causing the operation procedure manual A0 corresponding to the component B concerned to be displayed largely again, for example.

After that, the user repeats the above-described operation until the brought operation procedure manual A matches the component B.

As described above, the determination device 1 and the determination system 10 according to the present embodiment are configured to precisely determine whether the component B and the operation procedure manual A brought by the user match and if the component B and the operation procedure manual A brought by the user do not match, inform the user of the correct component B0 by causing the correct image I0 associated with the operation procedure manual A brought by the user to be displayed or inform the user by causing the correct operation procedure manual A0 corresponding to the component B brought by the user and information thereon to be displayed. Accordingly, the user can find the correct component B0 that matches the operation procedure manual A or can find the correct operation procedure manual A0 that matches the component B, and the component B and the operation procedure manual A can be matched precisely.

As a result, the user can make sure that the component B and the operation procedure manual A match and transfer the component B and the operation procedure manual A to a subsequent process, such as numbering, without concern.

The disclosure is not limited to the above-described embodiment but can be changed as appropriate within the scope not departing from the gist of the disclosure.

For example, although FIG. 5 and FIG. 6 each present a case where the image I in which the component B brought by the user is captured is displayed on the display screen 11 of the determination device 1, it is possible for the image I in which the component B brought by the user is captured not to be displayed on the display screen 11.

In addition, although the illustration is omitted, for example, the determination device 1 can be configured to perform automatic numbering on the component B using a numbering device when the determination device 1 determines that the component B and the operation procedure manual A brought by the user match, by transferring the component B to the numbering device automatically and transmitting necessary information from the determination device 1 to the numbering device, for example.

Moreover, the subsequent process of the determination process by the determination device 1 and the determination system 10 may be other processes than the numbering process for the component B. The determination device 1 and the determination system 10 according to an embodiment of the disclosure can be used widely to check a match between the component B and the operation procedure manual A and can also be used in finding the operation procedure manual A that matches the component B or the component B that matches the operation procedure manual A.

The invention claimed is:
1. A determination device comprising:
a computer configured to execute a determination process including:
receiving a captured image of a first component from an imaging device;

converting a color space of the captured image to an HSV color space including hue component, chroma component and lightness component;

modifying the captured image based on the hue component and the chroma component to generate a modified image excluding the lightness component from the captured image;

receiving an identification information of an operation procedure manual from an input device;

extracting a correct image that is associated with the identification information of the operation procedure manual from a database that stores corrected images and corresponding operation procedure manual information;

identifying a first component shape of the first component based on the modified image and identifying a second component shape of the second component based on the correct image to determine whether the first component shape and the second component shape agree; and when determining that the first component shape and the second component shape do not agree, causing a display screen to display an indication indicating that the first component and the operation procedure manual do not match.

2. The determination device according to claim 1, further comprising the display screen, wherein
the determination process further includes, when determining that the first component shape and the second component shape do not agree, causing the display screen to display the correct image associated with the operation procedure manual.

3. The determination device according to claim 1, further comprising the display screen, wherein
the determination process further includes, when determining that the first component shape and the second component shape do not agree, causing the display screen to display the operation procedure manual associated with the correct image or information on the operation procedure manual associated with the correct image.

4. The determination device according to claim 2, wherein when determining that the component and the operation procedure manual do not match, the operation procedure manual associated with the correct image or information on the operation procedure manual associated with the correct image is displayed on the display screen.

5. The determination device according to claim 1, further comprising:
the input device configured to input a number of the operation procedure manual;
the imaging device configured to capture the captured image of the first component; and
the database configured to store the correct image associated with the operation procedure manual and in which the second component is captured.

6. The determination device according to claim 2, further comprising:
the input device configured to input a number of the operation procedure manual;
the imaging device configured to capture the captured image of the first component; and
the database configured to store the correct image associated with the operation procedure manual and in which the second component is captured.

7. The determination device according to claim 3, further comprising:
the input device configured to input a number of the operation procedure manual;
the imaging device configured to capture the captured image of the first component; and
the database configured to store the correct image associated with the operation procedure manual and in which the second component is captured.

8. The determination device according to claim 4, further comprising:
the input device configured to input a number of the operation procedure manual;
the imaging device configured to capture the captured image of the first component; and
the database configured to store the correct image associated with the operation procedure manual and in which the second component is captured.

9. The determination device according to claim 1,
wherein the determination process further includes:
converting a color space of the correct image to an HSV color space including hue component, chroma component and lightness component; and
modifying the correct image based on the hue component and the chroma component to generate a modified correct image excluding the lightness component from the correct image,
wherein the second component shape of the second component is identified based on the modified correct image.

10. The determination device according to claim 1, wherein the computer is further configured to:
repeat the determination process until when determining that the first component shape and the second component shape agree, and
transfer, when determining that the first component shape and the second component shape agree, the first component and the operation procedure manual to a device used for a subsequent process to the determination process.

11. The determination device according to claim 10, wherein
the subsequent process is a numbering process in which the device performs numbering for an aircraft component on the first component,
the device is a numbering device configured to perform automatic numbering on the first component, and
the computer is further configured to:
transmit necessary information for the numbering to the numbering device; and
cause the numbering device to perform the numbering on the first component based on the necessary information.

12. The determination device according to claim 10, further comprising an illumination device, wherein height of the illumination device or the illumination direction of the illumination device are changeable.

* * * * *